(12) United States Patent
Gray et al.

(10) Patent No.: US 8,585,958 B2
(45) Date of Patent: Nov. 19, 2013

(54) PROCESS FOR MAKING AN EMBOSSED WEB

(75) Inventors: Brian Francis Gray, Cincinnati, OH (US); Sarah Beth Gross, Harrison, OH (US); Curtis Hunter Van Valkenburg, Mason, OH (US); Richard George Coe, Cincinnati, OH (US); Keith Joseph Stone, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 427 days.

(21) Appl. No.: 12/721,989

(22) Filed: Mar. 11, 2010

(65) Prior Publication Data

US 2010/0230866 A1 Sep. 16, 2010

Related U.S. Application Data

(60) Provisional application No. 61/159,906, filed on Mar. 13, 2009.

(51) Int. Cl.
*B29C 59/00* (2006.01)

(52) U.S. Cl.
USPC .......................................... 264/504; 264/555

(58) Field of Classification Search
None
See application file for complete search history.

(56) References Cited

U.S. PATENT DOCUMENTS

| | | |
|---|---|---|
| 3,600,361 A | 8/1971 | Heacock et al. |
| 3,719,736 A | 3/1973 | Woodruff |
| 3,750,508 A | 8/1973 | Miles |
| 3,779,285 A | 12/1973 | Sinbaldo |
| 3,911,187 A | 10/1975 | Raley |
| 4,211,743 A | 7/1980 | Kos et al. |
| 4,319,868 A | 3/1982 | Riemersma et al. |
| 4,343,848 A | 8/1982 | Leonard, Jr. |
| 4,546,029 A | 10/1985 | Cancio et al. |
| 4,695,422 A | 9/1987 | Curro et al. |
| 4,778,644 A | 10/1988 | Curro et al. |
| 5,158,819 A | 10/1992 | Goodman et al. |
| 5,281,371 A | 1/1994 | Tamura et al. |
| 5,650,215 A | 7/1997 | Mazurek et al. |
| 5,670,110 A | 9/1997 | Dirk et al. |
| 5,858,515 A | 1/1999 | Stokes et al. |

(Continued)

FOREIGN PATENT DOCUMENTS

| | | |
|---|---|---|
| DE | 34 39 555 A1 | 4/1986 |
| EP | 0 598 970 | 6/1994 |

(Continued)

OTHER PUBLICATIONS

International Search Report & Written Opinion, PCT/US2010/026895, mailed Jan. 7, 2010, 13 pages.

(Continued)

*Primary Examiner* — Monica Huson
(74) *Attorney, Agent, or Firm* — Andrew J. Mueller; Jason J. Camp

(57) ABSTRACT

A process for making an embossed web. A precursor web is provided between a forming structure and a static pressure plenum. The forming structure has a plurality of discrete apertures or depressions. Pressure is provided by the static pressure plenum against the precursor web and the forming structure to force the precursor web into the apertures or depressions of forming structure to form the embossed web. The resulting embossed web has a plurality of discrete extended elements.

23 Claims, 7 Drawing Sheets

(56) References Cited

U.S. PATENT DOCUMENTS

| | | | |
|---|---|---|---|
| 5,945,196 A | | 8/1999 | Ricker et al. |
| 5,972,280 A | * | 10/1999 | Hoagland .................... 264/555 |
| H1927 H | | 12/2000 | Chen et al. |
| 6,599,612 B1 | | 7/2003 | Gray |
| 6,719,742 B1 | | 4/2004 | McCormack et al. |
| 6,846,445 B2 | | 1/2005 | Kim et al. |
| 7,037,569 B2 | | 5/2006 | Curro et al. |
| 7,402,723 B2 | | 7/2008 | Stone et al. |
| 7,642,207 B2 | | 1/2010 | Bohemer et al. |
| 7,799,254 B2 | | 9/2010 | Harvey et al. |
| 2001/0014796 A1 | | 8/2001 | Mizutani et al. |
| 2003/0187170 A1 | | 10/2003 | Burmeister |
| 2003/0201582 A1 | | 10/2003 | Gray |
| 2003/0228445 A1 | | 12/2003 | Vaughn et al. |
| 2004/0046290 A1 | | 3/2004 | Kim et al. |
| 2004/0122395 A1 | | 6/2004 | Stone et al. |
| 2004/0131820 A1 | | 7/2004 | Turner et al. |
| 2004/0161586 A1 | | 8/2004 | Cree et al. |
| 2004/0209041 A1 | | 10/2004 | Muth et al. |
| 2005/0191496 A1 | | 9/2005 | Gray et al. |
| 2005/0279470 A1 | | 12/2005 | Redd et al. |
| 2006/0087053 A1 | | 4/2006 | O'Donnell et al. |
| 2006/0286343 A1 | | 12/2006 | Curro et al. |
| 2007/0062658 A1 | | 3/2007 | Wiwi et al. |
| 2007/0261224 A1 | | 11/2007 | McLeod |
| 2008/0200320 A1 | | 8/2008 | Buckner et al. |
| 2008/0264275 A1 | | 10/2008 | Wilhelm et al. |

FOREIGN PATENT DOCUMENTS

| | | |
|---|---|---|
| GB | 1344054 A | 1/1974 |
| WO | WO-97/13633 | 4/1997 |
| WO | WO 2008-120959 A1 | 10/2008 |

OTHER PUBLICATIONS

Nagarajan, Abbott, Yao; Rubber-Assisted Embossing Process; School of Polymer, Textile & Fiber Eng., Georgia Institute of Technology, Atlanta, GA 30332; ANTEC (2007) vol. 5, pp. 2921-2925, 5 pages.

Chang, Yang; Gas pressurized hot embossing for transcription of micro-features; Microsystem Technologies (2003) vol. 10, pp. 76-80, 5 pages; Springer-Verlag.

Dreuth, Heiden; Thermoplastic structuring of thin polymer films; Sensors and Actuators (1999) vol. 78, pp. 198-204, 7 pages; Institute of Applied Physics, University of Giessen, Heinrich-Buff-Ring 16 D-35392 Giessen, Germany; Elsevier Science S.A.

Heckele, Schomburg; Review on micro molding of thermoplastic polymers; Institute of Physics Publishing; Journal of Micromechanics and Microengineering (2004) vol. 14, No. 3, pp. R1-R14, 14 pages; IOP Publishing Ltd.

Kimerling, Liu, Kim, Yao; Rapid hot embossing of polymer microfeatures; Microsystem Technologies (2006) vol. 12, No. 8, pp. 730-735, 6 pages; School of Polymer, Textile and Fiber Eng., Georgia Institute of Technology, Atlanta GA 30332.

Nagarajan, Yao, Ellis, Azadegan; Through-Thickness Embossing Process for Fabrication of Three-Dimensional Thermoplastic Parts; School of Polymer, Textile & Fiber Eng., Georgia Institute of Technology, Atlanta GA 30332 and Delphi Research Labs, Shelby Township, Michigan 48315; Polymer Engineering and Science (2007) vol. 47, No. 12, pp. 2075-2084, 10 pages.

Rowland, King; Polymer deformation and filling modes during microembossing; Woodruff School of Mechanical Engineering, Georgia Institute of Technology, Atlanta, GA 30329-0405; Institute of Physics Publishing; Journal of Micromechanics and Microengineering (2004) vol. 14, No. 12, pp. 1625-1632, 8 pages; IOP Publishing Ltd.

Truckenmuller, Giselbrecht; Microthermoforming of flexible, not-buried hollow microstructures for chip-based life sciences applications; IEE Proceedings-Nanobiotechnology (Aug. 2004) vol. 151, No. 4, pp. 163-166; 4 pages.

Yao, Nagarajan; Cold Forging Method for Polymer Microfabrication; Department of Mechanical Engineering, Oakland University, Rochester, MI 48309; Polymer Engineering and Science (Oct. 2004) vol. 44, No. 10, pp. 1998-2004, 7 pages.

Yao, Nagarajan, Li, Yi; A Two-Station Embossing Process for Rapid Fabrication of Surface Microstructures on Thermoplastic Polymers; School of Polymer, Textile & Fiber Eng., Georgia Institute of Technology, Atlanta, GA 30332 and Department of Industrial, Welding and Systems Engineering, the Ohio State University, Columbus, OH 43210; Polymer Engineering and Science (2007) vol. 47, No. 4, pp. 530-539, 10 pages; Wiley InterScience; Society of Plastics Engineers.

Yao, Kuduva-Raman-Thanumoorthy; An enlarged process window for hot embossing; School of Polymer, Textile & Fiber Eng., Georgia Institute of Technology, Atlanta, GA 30332; Journal of Micromechanics and Microengineering (2008) vol. 18, pp. 1-7; 7 pages; IOP Publishing Ltd.

* cited by examiner

PROCESS FOR MAKING AN EMBOSSED WEB

CROSS REFERENCE TO RELATED APPLICATION

This application claims the benefit of U.S. Provisional Application No. 61/159,906, filed Mar. 13, 2009.

FIELD OF THE INVENTION

The invention relates to a process for making an embossed web comprising a plurality of discrete extended elements.

BACKGROUND OF THE INVENTION

Web materials, such as thermoplastic films, have a variety of uses including component materials of absorbent articles (such as topsheets and backsheets), packaging (such as flow wrap, shrink wrap, and polybags), trash bags, food wrap, dental floss, wipes, electronic components, and the like. For many of these uses of web materials, it can be beneficial for the web material to have a textured surface which can provide the surface of the web material with a desirable feel, visual impression, and/or audible impression.

Polymeric webs exhibiting a soft and silky tactile impression can be made via a vacuum forming process or a hydroforming process. With a typical vacuum forming process, a precursor web is heated and placed over a forming structure. Then a vacuum forces the precursor web to conform to the texture of the forming structure. The resulting polymeric web has texture that can provide a soft and silky tactile impression, depending upon the texture of the forming structure and degree of conformation. While a vacuum forming process can be suitable for making a soft and silky polymeric web, a vacuum forming process is typically limited with respect to the amount of pressure capable of being exerted onto a precursor web. As a result, it is usually required to heat a precursor film to significantly soften or melt the precursor film prior to placement on the forming structure in order to vacuum form the precursor film to the forming structure. A vacuum forming process is therefore an inefficient process in terms of how fast the process can be performed due to the heating step and the limited pressures generated by the process.

With a typical hydroforming process, a precursor web is placed over a forming structure and high pressure and high temperature water jets force the precursor web to conform to the texture of the forming structure. The resulting polymeric web can have texture that can provide a soft and silky tactile impression, depending upon the texture of the forming structure. A hydroforming process, although capable of producing soft and silky polymeric webs, is typically a costly and inefficient process involving the use of high pressure and high temperature water jets and subsequent drying steps, including dewatering steps.

Embossing is a process that typically involves the act of mechanically working a substrate to cause the substrate to conform under pressure to the depths and contours of a pattern engraved or otherwise formed on an embossing roll. It is widely used in the production of consumer goods. Manufacturers use the embossing process to impart a texture or relief pattern into products made of textiles, paper, synthetic materials, plastic materials, metals, and wood.

Embossing processes have been used to provide texture to polymeric films. However, such embossing processes typically require extruding a molten resin onto a forming structure or heating a precursor web before placement onto a forming structure and then embossing to produce an embossed web. The embossed web is then cooled, typically by cooling the embossing rolls or plates used to emboss the heated precursor web or molten resin. The cooling step is often utilized to set the texture in the embossed web. However, these heating and cooling steps add undesirable cost and inefficiency, as well as complexity, to the process. In addition, such embossing processes typically involve relatively large dwell times, which can result in slow, inefficient processes.

It is also typically difficult to impart relatively small scale texture to precursor webs using conventional embossing processes. Furthermore, typical embossing processes tend to produce embossed webs having relatively uniform thickness throughout the web.

For example, U.S. Pat. No. 5,972,280 discloses an embossing process utilizing a hot engraved surface of an embossing roll and static pressure applied within a chamber to heat a web and deform it over the surface of the embossed roll. This process uses elevated temperatures, which are typically above the softening temperature of the web, and relatively low pressures of about 0.007 MPa to about 0.7 MPa. As a result, the embossed pattern is formed as indentations disposed on only a single surface of the web, without affecting the opposite surface of the web.

Despite the knowledge in the art, there remains a desire to develop a more efficient process for making embossed webs that have desirable feel, visual impression, and/or audible impression, especially embossed webs exhibiting thinning in desirable areas of the embossed web. In certain aspects, a desired process is efficient with respect to the energy and resources required by the process. In certain aspects, a desired process is capable of running at high speeds. In certain aspects, a desired process is capable of running at relatively low temperatures, such as ambient temperature.

SUMMARY OF THE INVENTION

In one embodiment, a process for making an embossed web includes feeding a precursor web between a static gas pressure plenum and a forming structure having a plurality of discrete apertures, discrete depressions, or combinations thereof. The apertures or depressions of the forming structure have a depth that is at least three times a thickness of the precursor web. The method further includes applying pressure from the static gas pressure plenum against the precursor web opposite the forming structure thereby creating a differential pressure across the precursor web sufficient to force the precursor web into the apertures of the forming structure, thereby forming the embossed web comprising a plurality of discrete extended elements having open proximal ends.

Additional features of the invention may become apparent to those skilled in the art from a review of the following detailed description, taken in conjunction with the drawings, the examples, and the appended claims.

Figure 1:
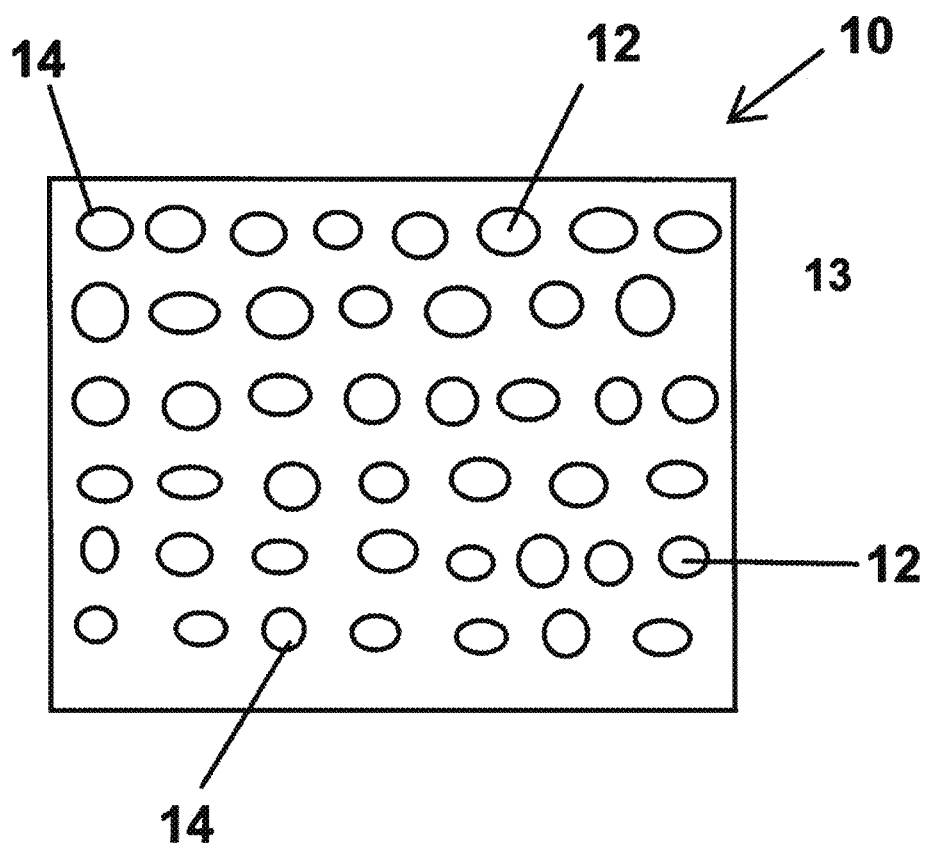
FIG. 1 is a top view of a forming structure in accordance with an embodiment of the disclosure.

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Disclosed herein is a process for forming an embossed web that overcomes one or more of the aforementioned shortcomings of the prior art. Specifically, embodiments of the process now make possible a more efficient web embossing process. For example, embodiments of the process can now make possible the ability to impart relatively small scale texture to webs. Furthermore, embodiments of the process can now make possible the ability to avoid the cumbersome heating and cooling steps that the prior art required. Still further, embodiments of the process do not require the large dwell times required of prior art processes. Additionally, as compared to prior art static pressure processes, embodiments of the process can allow for the formation of three-dimensional discrete extended elements having open proximal ends and open or closed distal ends. In certain embodiments, the process can be used to form macro-scale structures for use, for example, as packaging materials such as bubble wrap.

The process generally includes feeding a precursor web 34 between a static pressure plenum 36 and a forming structure 10. The forming structure 10 includes a plurality of discrete apertures 12, discrete depressions 14, or combinations thereof. The apertures 12 or depressions 14 have a depth that is at least substantially equal to the thickness of the precursor web 34, and preferably at least three times the thickness of the precursor web 34. The process further includes applying a pressure from the static pressure plenum 36 against the precursor web 34 and the forming structure 10 sufficient to force portions of the precursor web 34 into void volumes defined by the apertures 12 or depressions 14, thereby forming the embossed web 16. The embossed web 16 includes a plurality of discrete extended elements 22 having open proximal ends 30. These aspects of the process are described in further detail below.

Forming Structure

Figure 2:
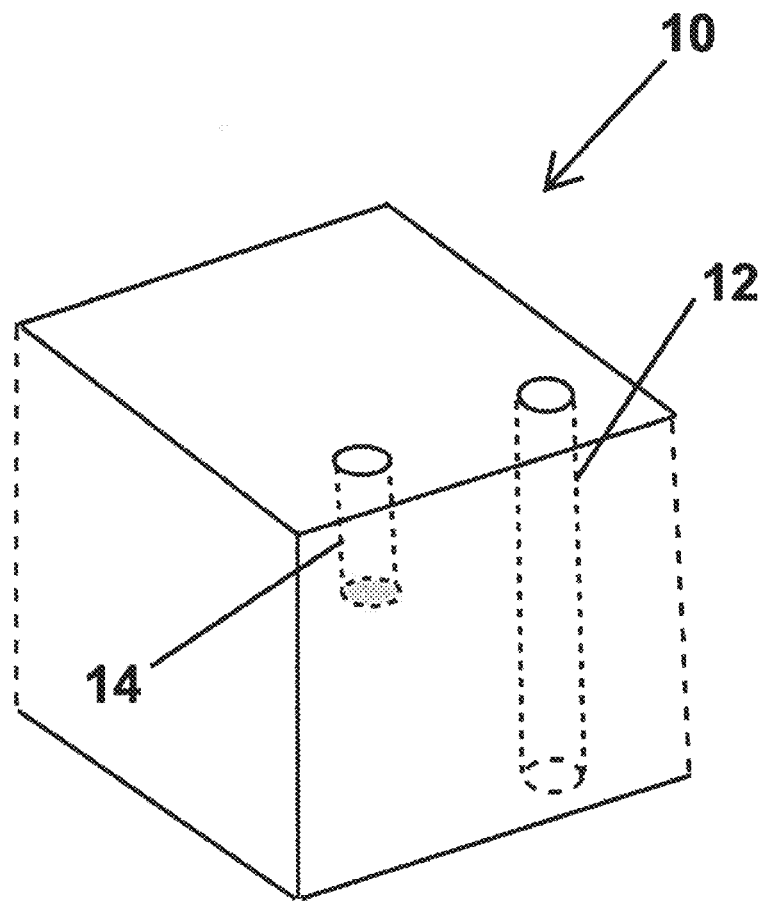
FIG. 2 is a perspective view of a forming structure in accordance with an embodiment of the disclosure illustrating the distinction between apertures and depressions.

Referring to FIGS. 1 and 2, a forming structure 10 useful in the process of the present disclosure includes a plurality of discrete apertures 12, discrete depressions 14, or a combination thereof. The forming structure 10 can further include lands 13 completely surrounding the discrete apertures 12 or depressions 14. The discrete apertures 12 or depressions 14 of the forming structure 10 are small in scale relative to typical patterns used on forming structures in conventional embossing processes. The process of the disclosure can produce embossed webs that include relatively high aspect ratio extended elements with thinned distal ends 24, even without heating the precursor web 34 and even at high speeds.

The forming structure 10 is sometimes referred to as a forming screen. FIG. 2 illustrates the distinction between apertures 12 and depressions 14. As used herein, "apertures" refers to an opening in the forming structure 10 that does not include a bottom surface limiting the depth of the opening. In contrast, as used herein, "depressions" refers to an opening in the forming structure 10 having a bottom surface limiting the depth of the opening to be less than the thickness of the forming structure 10. The bottom surface can be, for example, porous or non-porous. In one embodiment, the forming structure has a means to allow the gas under the web to escape. For example, the depressions 14 of the forming structure 10 can include vent holes in the bottom of the depression. Optionally, a vacuum assist is provided to remove the gas under the web and increase the pressure differential. The bottom surface can be flat, rounded, or sharp. The forming structure 10 can be a solid roll, or have a thickness of about 25 microns to about 5000 microns, or about 100 microns to about 3000 microns. The depressions 14 can have a depth in a range of about 10 microns to about 500 microns, or about 25 microns to about 5000 microns.

The perimeter of the apertures 12 or depressions 14 on the precursor web 34 contacting surface of the forming structure 10 can have a straight edge or can have a radius of curvature as measured from the precursor web 34 contacting surface of the forming structure 10 into the aperture 12 or depression 14. The radius of curvature can be about 0 microns to about 2000 microns, preferably about 0 microns to about 100 microns, and more preferably about 2 microns to about 25 microns. In one embodiment, an angled taper, commonly known as a chamfer, is used. In one embodiment a combination of straight edges and radii are used.

The apertures 12 or depressions 14 have a diameter, which for a generally cylindrical structure is the inside diameter. For non-uniform cross-sections, and/or non-cylindrical structures of apertures 12 or depressions 14, diameter is measured as the average cross-sectional dimension of apertures 12 or depressions 14 at the top surface of the forming structure. Each aperture or depression can have diameter of about 10 microns to about 5 mm. Other suitable diameters include, for example, of about 50 microns to about 500 microns, about 65 microns to about 300 microns, about 75 microns to about 200 microns, about 100 microns to about 25,000 microns, about 500 microns to about 5000 microns, or about 800 microns to about 2,500 microns. In certain embodiments, the apertures 12 or depressions 14 can have larger diameters for forming macro-scale discrete extended elements. For example, the apertures 12 or depressions 14 can have a diameter up to about 2.5 centimeters, up to about 2 centimeters, up to about 1.5 centimeters, up to about 1 cm, up to about 0.5 centimeters, or up to about 0.1 centimeters.

In one embodiment, the diameter of apertures 12 or depressions 14 is constant or decreases with increasing depth. In another embodiment, the diameter of the apertures 12 or depressions 14 increases with increasing depth. For example, the discrete apertures 12 or depressions 14 can have a first diameter at a first depth and a second diameter at a second depth deeper than the first depth. For example, the first diameter can be larger than the second diameter. For example, the second diameter can be larger than the first diameter.

The sidewalls of the discrete apertures 12 or depressions 14 can be completely vertical or can be tapered. In one embodiment, the discrete apertures 12 or depressions 14 have tapered sidewalls. This can allow the web to more easily separate from the forming structure 10 after embossing. In one embodiment, the sidewalls will typically have a degree of taper of about −50° to about 50°, about −30° to about 30°, 0° to about 50°, about 2° to about 30°, or about 5° to about 25°.

The discrete apertures 12 or depressions 14 of the forming structure 10 can have a variety of different cross-sectional shapes, such as generally columnar or non-columnar shapes, including circular, oval, hour-glass shaped, star shaped, polygonal, and the like, and combinations thereof. Polygonal cross-sectional shapes include, but are not limited to, rectangular, triangular, hexagonal, or trapezoidal. In one embodiment, the discrete depressions 14 can have a length substantially equal to the length of the forming structure 10 so as to form grooves about substantially the entire length of the forming structure 10. For example, when the forming structure 10 is in the form of a roll, the grooves can be formed about the entire circumference of the roll. The grooves can be substantially straight (e.g., consistently parallel to the edge of the roll) or can be wavy.

In general, the forming structure 10, for a given portion thereof, will include at least about 95 discrete apertures 12 or depressions 14 per square centimeter, at least about 240 discrete apertures 12 or depressions 14 per square centimeter, about 350 to about 10,000 discrete apertures 12 or depressions 14 per square centimeter, about 500 to about 5,000 discrete apertures 12 or depressions 14 per square centimeter, or about 700 to about 3,000 discrete apertures 12 or depressions 14 per square centimeter. In certain embodiments, the apertures 12 or depressions 14 can have a diameter greater than about 1 cm. Such larger sized apertures 12 or depressions 14 can be useful in forming embossed webs having larger-sized discrete extended elements, such as for example, for packing material. In these embodiments, the forming structure 10, for a given portion thereof, can include about 1 to about 5 discrete apertures 12 or depressions 14 per 10 square centimeters.

The apertures 12 or depressions 14 can have an edge-to-edge spacing between two adjacent apertures 12 or depressions 14 of about 30 microns to about 1000 microns, about 30 microns to about 800 microns, about 150 microns to about 600 microns, or about 180 microns to about 500 microns. In certain embodiments, a portion (or area) of the forming structure 10 can include area densities of discrete apertures 12 or depressions 14 as described in the preceding paragraph, while other portions (or areas) of the forming structure 10 may include no discrete apertures 12 or depressions 14. The areas of the forming structure 10 having no discrete apertures 12 or depressions 14 can be located in a different horizontal plane. In other embodiments, the discrete apertures 12 or depressions 14 of the forming structure 10 can be located in different horizontal planes of the forming structure 10. The regions having no discrete apertures 12 or depressions 14 and/or the regions having discrete apertures 12 or depressions 14 located in different horizontal planes of the forming structure 10 can be in the form of a specific pattern or design, such as a flower, bird, ribbon, wave, cartoon character, logo, and the like, so that the embossed web 16 will have a region that stands out visually from, and/or has a different hand feel when touched relative to, the remainder of the web. For example, the embossed web 16 can include a non-embossed region that stands out visually from, and/or has a different hand feel from embossed regions. U.S. Pat. No. 5,158,819, the disclosure of which is incorporated herein by reference, provides suitable examples of forming structures for use in these embodiments.

In one embodiment, a ratio of the average depth of the apertures 12 or depressions 14 to the thickness of the precursor web 34 is at least about 1:1, at least about 2:1, at least about 3:1, at least about 4:1, at least about 5:1, or at least about 10:1. This ratio can be important to ensure the precursor web 34 is sufficiently stretched so that it becomes permanently deformed to create an embossed web 16, especially at desirable process conditions and speed.

Forming structure 10 can be made of any material or materials that can be formed to have apertures 12 or depressions 14 having the necessary dimensions to make an embossed web 16 and is dimensionally stable over process temperature and pressure ranges experienced by forming structure 10.

In one embodiment, the forming structure 10 having the required relatively small scale apertures 12 or depressions 14 can be made by local, selective removal of material, such as by chemical etching, mechanical etching, or by ablating by use of high-energy sources such as electrical-discharge machines (EDM) or lasers, or by electron beam (e-beam), or by electrochemical machining (ECM). In one embodiment, the forming structure may be constructed by a photo etched laminate process generally in accordance with the teachings of U.S. Pat. No. 4,342,314.

In one method of making a suitable forming structure 10, a base material susceptible to laser modification is laser "etched" to selectively remove material to form apertures 12 or depressions 14. By "susceptible to laser modification", it is meant that the material can be selectively removed by laser light in a controlled manner, recognizing that the wavelength of light used in the laser process, as well as the power level, may need to be matched to the material (or vice-versa) for optimum results. Laser etching can be achieved by known laser techniques, selecting wavelength, power, and time parameters as necessary to produce the desired protruded element dimensions. Currently known materials susceptible to laser modification include thermoplastics such as polypropylene, acetal resins such as DELRIN® from DuPont, Wilmington Del., USA, thermosets such as crosslinked polyesters, or epoxies, or even metals such as aluminum, copper, brass, nickel, stainless steel, or alloys thereof. Optionally, thermoplastic and thermoset materials can be filled with particulate or fiber fillers to increase compatibility with lasers of certain wavelengths of light and/or to improve modulus or toughness to make more durable apertures 12 or depressions 14. For example, certain polymers, such as PEEK, can be laser machined to higher resolution and at higher speeds by uniformly filling the polymer with sufficient amounts of hollow carbon nanotube fibers.

In one embodiment, a forming structure 10 can be laser machined in a continuous process. For example, a polymeric material such as DELRIN® can be provided in a cylindrical form as a base material having a central longitudinal axis, an outer surface, and an inner surface, the outer surface and inner surface defining a thickness of the base material. It can also be provided as a solid roll. A moveable laser source can be directed generally orthogonal to the outer surface. The moveable laser source can be moveable in a direction parallel to the central longitudinal axis of the base material. The cylindrical base material can be rotated about the central longitudinal axis while the laser source machines, or etches, the outer surface of the base material to remove selected portions of the base material in a pattern that defines a plurality of discrete apertures 12 or depressions 14.

The forming structure 10 can be in the form of a flat plate, a roll, a belt, an endless belt, a sleeve, or the like. In one preferred embodiment, the forming structure 10 is in the form of a roll. In another preferred embodiment, the forming structure 10 is in the form of an endless belt. Endless belts can be formed in accordance with the teachings of U.S. Pat. Nos. 7,655,176, 6,010,598, 5,334,289, and 4,529,480.

The forming structure 10 can optionally further include discrete protruded elements. The discrete protruded elements can be sized and shaped and be formed as is described in co-pending U.S. Provisional Patent Application Ser. No. 61/159,906. If the forming structure 10 further includes protruded elements, the precursor web 34 can be forced onto the protruded elements of the forming structure 10, such that discrete extended elements 22 can be formed in the precursor web 34 extending from the surface of the precursor web 34 opposite the surface from which the discrete extended elements 22 formed by the apertures 12 or depressions 14 of the forming structure 10 are formed. As a result, a two-sided embossed web 16 can be created, having different patterns or dimensions of extended elements on each side of the embossed web 16. Depending upon the pressure generated between the forming structure 10 and compliant substrate, as well as the geometric shapes of the apertures 12 or depressions 14 and optional pillars or ridges of the forming structure 10, the discrete extended elements 22 of the embossed web 16 can have closed or open distal ends 24.

Static Pressure Plenum

Figure 6:
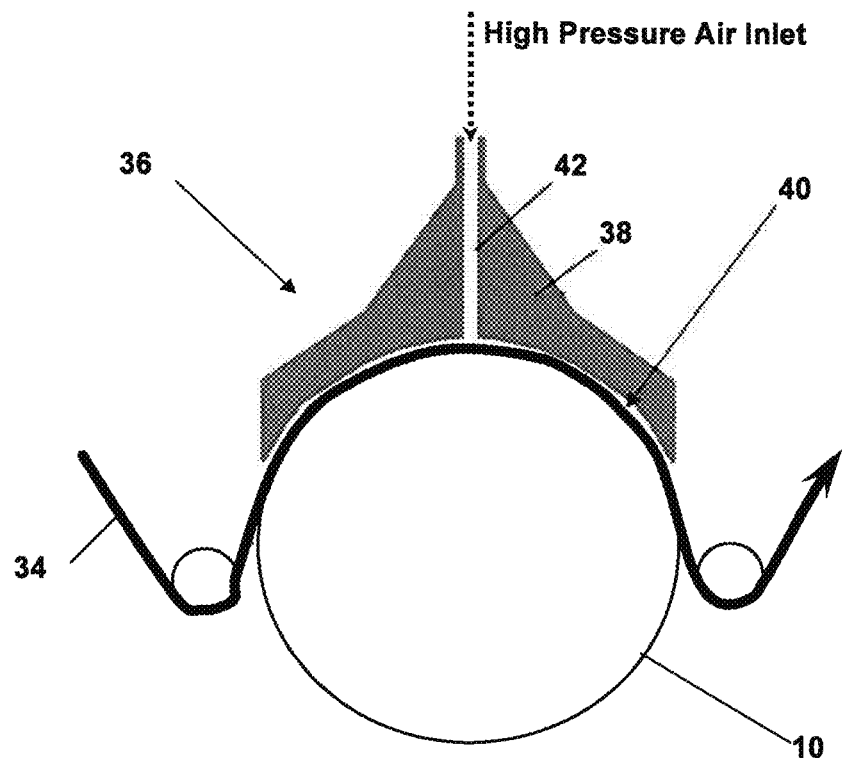
FIG. 6 is a schematic representation of a process in accordance with an embodiment of the disclosure, illustrating a static gas pressure plenum.

Referring to FIG. 6, a static pressure plenum 36 is utilized to provide a force against precursor web 34 to force the precursor web 34 into the apertures 12 or depressions 14 of the forming structure 10. Preferably, the static pressure plenum 36 is a static gas pressure plenum. The gas can be air, nitrogen, carbon dioxide, and the like, or combinations thereof.

The static gas pressure plenum 36 exerts a pressure on the precursor web 34. The static gas pressure plenum 36 can include a hood 38 which defines a plenum 40 adjacent the precursor web 34. The hood 38 can include at least one high pressure gas inlet 42 allowing high pressure gas or other fluid to enter the hood 38 creating the static pressure conditions. Under static gas pressure conditions, there is no velocity and density impinging upon the unembossed precursor web 34 as with a velocity pressure source such as an air knife. Rather, a static high gas pressure is maintained in the hood 38 which creates a pressure differential across the precursor web, between the static pressure plenum 36 facing surface of the precursor web 34 and the forming structure 10 facing surface of the precursor web 34. In one embodiment, the hood 38 can be wider than the precursor web, which can enhance the seal formed with the hood 38. The pressure differential is sufficient to force the precursor web 34 into the apertures 12 or depressions 14 of the forming structure 10. The pressure differential can be enhanced, for example, by applying a vacuum on the forming structure 10 facing surface of the precursor web 34.

Suitable static gas pressure plenums are also described in U.S. Provisional Patent Application Ser. No. 61/313,122, filed Mar. 11, 2010 entitled "APPARATUS FOR EMBOSSING A WEB" (P&G Case 11639P), and in U.S. Pat. No. 5,972,280.

Precursor Web

A precursor web 34 is converted into an embossed web 16 according to the process of the disclosure. Suitable precursor webs include materials that can be deformed by the pressure differential generated by the static pressure plenum 36 across the precursor web 34, such that the precursor web 34 is forced into the apertures 12 or depressions 14 of the forming structure 10 to produce an embossed web 16.

The precursor web 34 typically includes synthetic material, metallic material, biological material (in particular, animal-derived materials), or combinations thereof. The precursor web 34 can optionally include cellulosic material. In one embodiment, the precursor web 34 is free of cellulosic material. Non-limiting examples of suitable precursor webs include films, such as polymeric or thermoplastic films, foils, such as metallic foils (e.g. aluminum, brass, copper, and the like), webs comprising sustainable polymers, foams, fibrous nonwoven webs comprising synthetic fibers (e.g. TYVEK®), collagen films, chitosan films, rayon, cellophane, and the like. Suitable precursor webs further include laminates or blends of these materials.

If the precursor is a fibrous web, the fibrous web typically will have a high density such that it behaves similar to a film material. One example of such a high density fibrous web is TYVEK®.

In one embodiment, the precursor web 34 is a polymeric film. Suitable polymeric films include thermoplastic films such as polyethylene, polypropylene, polystyrene, polyethylene terephthalate (PET), polymethylmethacrylate (PMMA), polyvinyl alcohol (PVA), nylon, polytetrafluoroethylene (PTFE) (e.g., TEFLON), or combinations thereof. Suitable polymeric films can include blends or mixtures of polymers.

In certain embodiments, the precursor web 34 can be a web comprising a sustainable polymer, such as polylactides, polyglycolides, polyhydroxyalkanoates, polysaccharides, polycaprolactones, and the like, or mixtures thereof.

The thickness of the precursor web 34 prior to embossing will typically range from about 5 to about 300 microns, about 5 microns to about 150 microns, about 5 microns to about 100 microns, or about 15 microns to about 50 microns. Other suitable thicknesses includes about 1, 2, 3, 4, 5, 6, 7, 8, 9, 10, 20, 30, 40, 50, 60, 70, 80, 90, 100, 150, 200, 250, or 300 microns.

Precursor webs, such as polymeric webs, will typically have a glass transition temperature of about −100° C. to about 120° C., or about −80° C. to about 100° C., or other suitable ranges. Precursor webs, such as polymeric webs, can have a melting point of about 100° C. to about 350° C. For example, a precursor web 34 formed of LDPE or a blend of LDPE and LLDPE has a melting pointing of about 110° C. to about 122°. A precursor web 34 formed of polypropylene has a melting point of about 165° C. A precursor web 34 formed of polyester has a melting point of about 255° C. A precursor web 34 formed of Nylon 6 has a melting point of about 215° C. A precursor web 34 formed of PTFE has a melting point of about 327° C.

In one embodiment, the process is carried out at a temperature less than the melting point of the precursor web. For example, the process can be carried out at 10° C. less than the melting point of the precursor web. In another embodiment, the process is carried out at a temperature substantially equal to the melting point of the precursor web. In one embodiment, the process is carried out at a temperature greater than the glass transition temperature of the precursor web.

Optionally, the precursor web 34 may be plasticized to make it less brittle prior to embossing in the process.

In one embodiment, the precursor web 34 is strain hardening. The strain hardening properties of the precursor web 34 can be desirable to facilitate conformation of the precursor web 34 to the discrete protruded elements of the forming structure 10. This can be preferred for producing embossed webs wherein closed distal ends 24 of the extended elements 22 of the embossed web 16 are desired.

The precursor web 34 can be any material, such as a polymeric film, having sufficient material properties to be formed into an embossed web 16 described herein by the embossing process of the disclosure. The precursor web 34 will typically have a yield point and the precursor web 34 is preferably stretched beyond its yield point to form an embossed web 16. That is, the precursor web 34 should have sufficient yield properties such that the precursor web 34 can be strained without rupture to an extent to produce the desired discrete extended elements 22 with closed distal ends 24 or, in the case of an embossed web 16 comprising discrete extended elements 22 having open distal ends 24, rupture to form open distal ends 24. As disclosed below, process conditions such as temperature can be varied for a given polymer to permit it to stretch with or without rupture to form the embossed web 16 having the desired discrete extended elements 22. In general, therefore, it has been found that preferred starting materials to be used as the precursor web 34 for producing the embossed web 16 exhibit low yield and high-elongation characteristics. In addition, as discussed previously, the precursor webs preferably strain harden. Examples of films suitable for use as the precursor web 34 include films comprising low density polyethylene (LDPE), linear low-density polyethylene (LLDPE), and blends of linear low-density polyethylene and low density polyethylene (LLDPE/LDPE).

Precursor web 34 should also be sufficiently deformable and have sufficient ductility for use as a precursor web 34. The term "deformable" as used herein describes a material which, when stretched beyond its elastic limit, will substantially retain its newly formed conformation, as well as exhibit thinning at the distal ends 24 and/or along the sidewalls of the discrete extended elements 22 of the resulting embossed web 16.

One material found suitable for use as a precursor web 34 is DOWLEX 2045A polyethylene resin, available from The Dow Chemical Company, Midland, Mich., USA. A film of this material having a thickness of 20 microns can have a tensile yield of at least 12 MPa; an ultimate tensile of at least 53 MPa; an ultimate elongation of at least 635%; and a tensile modulus (2% Secant) of at least 210 MPa (each of the above measures determined according to ASTM D 882). Other suitable precursor webs include polyethylene film that is about 25 microns (1.0 mil) thick and has a basis weight of about 24 grams per square meter ("gsm") available from available from RKW US, Inc. (Rome, Ga.) and polyethylene/polypropylene film having a basis weight of about 14 gsm and a thickness of about 15 microns available from RKW US, Inc.

The precursor web 34 can be a laminate of two or more webs, and can be a co-extruded laminate. For example, precursor web 34 can include two layers, and precursor web 34 can include three layers, wherein the innermost layer is referred to as a core layer, and the two outermost layers are referred to as skin layers. In one embodiment, the precursor web 34 includes a three layer coextruded laminate having an overall thickness of about 25 microns (0.001 in.), with the core layer having a thickness of about 18 microns (0.0007 in.); and each skin layer having a thickness of about 3.5 microns (0.00015 in.). In one embodiment, the layers can include polymers having different stress-strain and/or elastic properties.

The precursor web 34 can be made using conventional procedures for producing multilayer films on conventional coextruded film-making equipment. Where layers comprising blends are required, pellets of the above described components can be first dry blended and then melt mixed in the extruder feeding that layer. Alternatively, if insufficient mixing occurs in the extruder, the pellets can be first dry blended and then melt mixed in a pre-compounding extruder followed by repelletization prior to film extrusion. Suitable methods for making precursor web 34 are disclosed in U.S. Pat. No. 5,520,875 and U.S. Pat. No. 6,228,462.

In general, the ability to form high area density (or low average center-to-center spacing) discrete extended elements 22 on the embossed web 16 can be limited by the thickness of precursor web 34.

In certain embodiments, the precursor web 34 can optionally further include a surfactant. If utilized, preferred surfactants include those from non-ionic families such as: alcohol ethoxylates, alkylphenol ethoxylates, carboxylic acid esters, glycerol esters, polyoxyethylene esters of fatty acids, polyoxyethylene esters of aliphatic carboxylic acids related to abietic acid, anhydrosorbitol esters, ethoxylated anhydrosorbitol esters, ethoxylated natural fats, oils, and waxes, glycol esters of fatty acids, carboxylic amides, diethanolamine condensates, and polyalkyleneoxide block copolymers. Molecular weights of surfactants selected can range from about 200 grams per mole to about 10,000 grams per mole. Preferred surfactants have a molecular weight of about 300 to about 1,000 grams per mole.

If utilized, the surfactant level initially blended into precursor web 34 can be as much as 10 percent by weight of the total precursor web 34. Surfactants in the preferred molecular weight range (300-1,000 grams/mole) can be added at lower levels, generally at or below about 5 weight percent of the total precursor web 34.

In certain embodiments, the precursor web 34 can also include titanium dioxide in the polymer blend. Titanium dioxide can provide for greater opacity of the embossed web 16. Titanium dioxide can be added at up to about 10 percent by weight of the precursor web 34, such as low density polyethylene.

Other additives, such as particulate material, e.g., carbon black, iron oxide, mica, calcium carbonate ($CaCO_3$), particulate skin treatments or protectants, or odor-absorbing actives, e.g., zeolites, can optionally be added in one or more layers of precursor web 34. In some embodiments, embossed webs comprising particulate matter, when used in skin-contacting applications, can permit actives to contact the skin in a very direct and efficient manner. Specifically, in some embodiments, formation of discrete extended elements 22 can expose particulate matter at or near the distal ends 24 thereof. Therefore, actives such as skin care agents can be localized at or near distal ends 24 of the discrete extended elements 22 to permit direct skin contact with such skin care agents when the embossed web 16 is used in skin contacting applications.

The average particle size of the particulate material, if utilized in the precursor web 34, will typically be 0.2 to about 200 microns or about 5 microns to about 100 microns. The use of certain particulate materials, such as mica interference particles, can dramatically improve the visual appearance of the embossed web 16.

The precursor web 34 can also optionally include colorants, such as pigment, lake, toner, dye, ink or other agent used to impart a color to a material, to improve the visual appearance of the embossed web 16.

Suitable pigments herein include inorganic pigments, pearlescent pigments, interference pigments, and the like.

Non-limiting examples of suitable pigments include talc, mica, magnesium carbonate, calcium carbonate, magnesium silicate, aluminum magnesium silicate, silica, titanium dioxide, zinc oxide, red iron oxide, yellow iron oxide, black iron oxide, carbon black, ultramarine, polyethylene powder, methacrylate powder, polystyrene powder, silk powder, crystalline cellulose, starch, titanated mica, iron oxide titanated mica, bismuth oxychloride, and the like.

Suitable colored webs are described in co-pending U.S. application Ser. No. 12/721,947, filed Mar. 11, 2010 entitled "COLORED WEB MATERIAL COMPRISING A PLURALITY OF DISCRETE EXTENDED ELEMENTS" (P&G Case 11634) and U.S. application Ser. No. 12/721,965, filed Mar. 11, 2010 entitled "WEB MATERIAL EXHIBITING VIEWING-ANGLE DEPENDENT COLOR AND COMPRISING A PLURALITY OF DISCRETE EXTENDED ELEMENTS" (P&G Case 11635).

The precursor web 34 can also optionally include fillers, plasticizers, and the like.

Embossed Web

Figure 3:
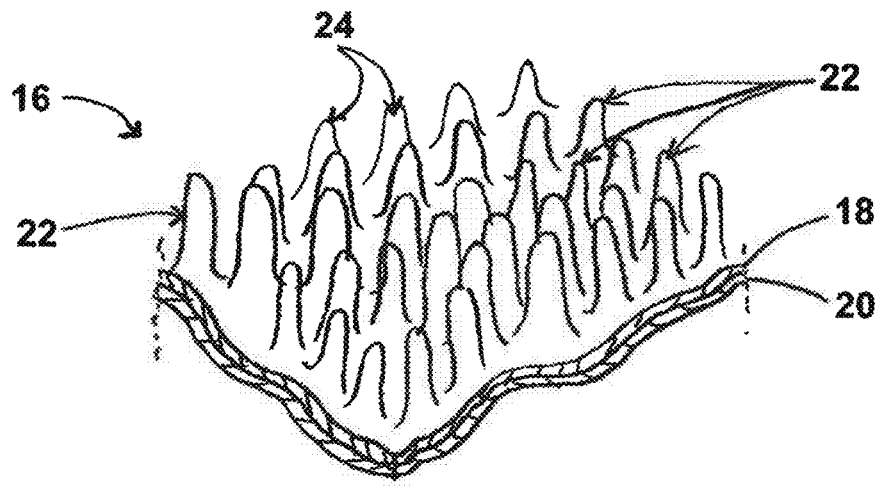
FIG. 3 is a perspective view of a portion of an embossed web formed by a process in accordance with an embodiment of the disclosure.
Figure 4:
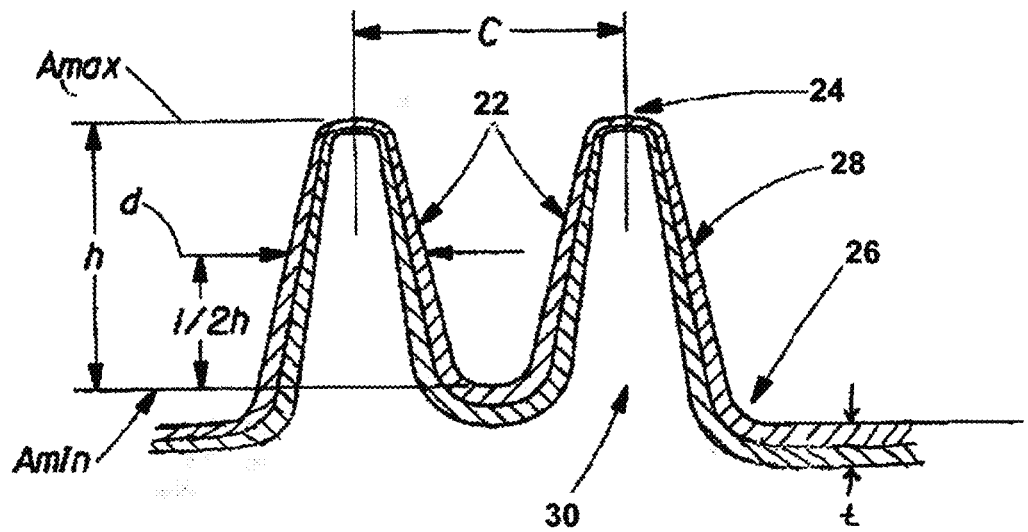
FIG. 4 is a cross-sectional view of a portion of an embossed web formed by a process in accordance with an embodiment of the disclosure.
Figure 5:
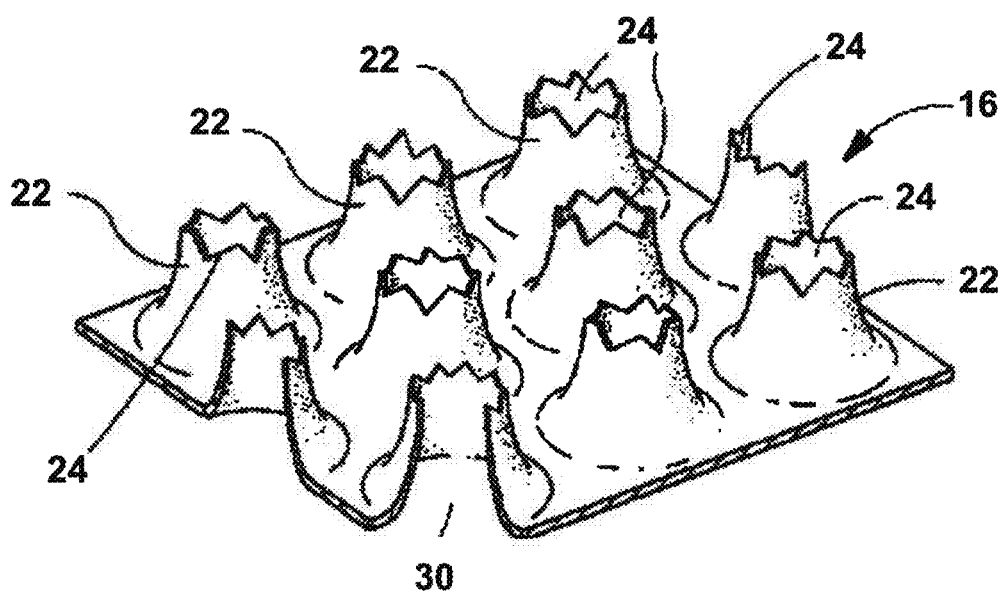
FIG. 5 is a perspective view of a portion of an embossed web having discrete extended elements with open distal ends formed by a process in accordance with an embodiment of the disclosure.

The precursor web 34 is processed according to the process of the disclosure to form an embossed web 16 that can have various desired structural features and properties such as desired soft hand feel and an aesthetically pleasing visual appearance. The precursor web 34 is positioned between the forming structure 10 and the static pressure plenum 36 provided to conform the precursor web 34 to the discrete apertures 12 or depressions 14 of the forming structure 10. Referring to FIG. 3, an embossed web 16 having discrete extended elements 22 is thereby produced. As shown in FIG. 4, the discrete extended elements 22 have open proximal ends 30 and open (as shown in FIG. 5) or closed distal ends 24 (as shown in FIGS. 3 and 4).

In one embodiment, the embossed web 16 resulting from the process described herein can have a structure 10 similar to that described in detail in U.S. Pat. No. 7,402,723 or U.S. Pat. No. 7,521,588.

The three-dimensional embossed web 16 is produced from a precursor web 34, which can be a single layer of web material or a multilayer coextruded or laminate web material as described hereinbefore. Laminate film materials may be coextruded, as is known in the art for making laminate films, including films comprising skin layers. In the embodiment illustrate in FIG. 3, the precursor web 34 is a two layer laminate film comprising a first layer 18 and a second layer 20.

The discrete extended elements 22 are formed as protruded extensions of the web, generally on a first surface 26 thereof. The number, size, and distribution of discrete extended elements 22 on the embossed web 16 can be predetermined based on desired soft feel and visual effects. For applications such as a topsheet, backsheet or release paper wrapper in disposable absorbent articles, or packaging, it can be desired that the discrete extended elements 22 protrude only from one surface of embossed web 16. Therefore, when the embossed web 16 is used as a topsheet in a disposable absorbent article, the embossed web 16 can be oriented such that the discrete extended elements 22 are skin contacting for superior softness impression. Moreover, having discrete extended elements 22 with closed distal ends 24 can result in reduced rewet, i.e., reduced amounts of fluid being re-introduced to the surface of the topsheet after having been first passed through apertures 12 of the topsheet to underlying absorbent layers.

Referring to FIG. 4, the discrete extended elements 22 can be described as protruding from a first surface 28 of the embossed web 16. As such, the discrete extended elements 22 can be described as being integral with precursor web 34, and formed by permanent local plastic deformation of the precursor web 34. The discrete extended elements 22 can be described as having a side wall(s) 28 defining an open proximal portion 30 and a closed or open distal end 24. The discrete extended elements 22 each have a height h measured from a minimum amplitude $A_{min}$ between adjacent extended elements to a maximum amplitude $A_{max}$ at the closed or open distal end 24. The discrete extended elements 22 have a diameter d, which for a generally cylindrical structure 10 is the outside diameter at a lateral cross-section. By "lateral" is meant generally parallel to the plane of the first surface 26. For generally columnar discrete extended elements 22 having non-uniform lateral cross-sections, and/or non-cylindrical structures of discrete extended elements 22, diameter d is measured as the average lateral cross-sectional dimension at ½ the height h of the discrete extended element. Thus, for each discrete extended element, an aspect ratio, defined as h/d, can be determined. The discrete extended element can have an aspect ratio h/d of at least about 0.2, at least about 0.3, at least about 0.5, at least about 0.75, at least about 1, at least about 1.5, at least about 2, at least about 2.5, or at least about 3. The discrete extended elements 22 will typically have a height h of at least about 30 microns, at least about 50 microns, at least about 65, at least about 80 microns, at least about 100 microns, at least about 120 microns, at least about 150 microns, or at least about 200 microns. The extended elements will typically be at least the same height as the thickness of the precursor web, or at least 2 times the thickness of the precursor web, or preferably at least 3 times the thickness of the precursor web. The discrete extended elements 22 will typically have a diameter d of about 50 microns to about 5,000 microns, about 50 microns to about 3,000 microns, about 50 microns to about 500 microns, about 65 microns to about 300 microns, or about 75 microns to about 200 microns. In certain embodiments, the discrete extended elements 22 can have larger diameters d up to about 2.5 centimeters, up to about 2 centimeters, up to about 1.5 centimeters, up to about 1 cm, up to about 0.5 centimeters, or up to about 0.1 centimeters.

For discrete extended elements 22 that have generally non-columnar or irregular shapes, a diameter of the discrete extended element can be defined as two times the radius of gyration of the discrete extended element at ½ height.

For discrete extended elements that have shapes, such as ridges, that extend lengthwise across the entire web material such that the extended elements have a portion of the sidewalls of the extended elements that are open, a diameter of a discrete extended element can be defined as the average minimal width between two opposing sidewalls of the extended element at ½ height.

In general, because the actual height h of any individual discrete extended element can be difficult to determine, and because the actual height may vary, an average height $h_{avg}$ of a plurality of discrete extended elements 22 can be determined by determining an average minimum amplitude $A_{min}$ and an average maximum amplitude $A_{max}$ over a predetermined area of the embossed web 16. Such average height $hp_{avg}$ will typically fall within the ranges of heights described above. Likewise, for varying cross-sectional dimensions, an average diameter $d_{avg}$ can be determined for a plurality of discrete extended elements 22. Such average diameter $d_{avg}$ will typically fall within the ranges of diameters described above. Such amplitude and other dimensional measurements can be made by any method known in the art, such as by computer aided scanning microscopy and data processing. Therefore, an average aspect ratio $AR_{avg}$ of the discrete extended elements 22 for a predetermined portion of the embossed web 16 can be expressed as $h_{avg}/d_{avg}$.

In one embodiment, the diameter of a discrete extended element is constant or decreases with increasing amplitude (amplitude increases to a maximum at closed or open distal end 24). The diameter, or average lateral cross-sectional dimension, of the discrete extended elements 22 can be a maximum at proximal portion and the lateral cross-sectional dimension steadily decreases to distal end. This structure 10 is believed to be desirable to help ensure the embossed web 16 can be readily removed from the forming structure 10. In another embodiment, the diameter of the discrete extended elements 22 increases with increasing amplitude. For example, the discrete extended elements 22 can have a mushroom shape.

Thinning of the precursor web 34 can occur due to the relatively deep drawing required to form high aspect ratio discrete extended elements 22. For example, thinning can be observed at the closed or open distal ends 24 and/or along the sidewalls. By "observed" is meant that the thinning is distinct when viewed in magnified cross-section. Such thinning can be beneficial as the thinned portions offer little resistance to compression or shear when touched. For example, when a person touches the embossed web 16 on the side exhibiting discrete extended elements 22, the fingertips of the person first contact the closed or open distal ends 24 of the discrete extended elements 22. Due to the high aspect ratio of the discrete extended elements 22, and the wall thinning of the precursor web 34 at the distal ends 24 and/or along the sidewalls, the discrete extended elements 22 offer little resistance to the compression or shear imposed on the embossed web 16 by the person's fingers. This lack of resistance is registered as a feeling of softness, much like the feeling of a velour fabric.

Thinning of the precursor web 34 at the closed or open distal ends 24 and/or along the sidewalls can be measured relative to the thickness of the precursor web 34 or relative to the thickness of the land area that completely surrounds the discrete extended elements 22 of the embossed web 16. The precursor web 34 will typically exhibit thinning of at least about 25%, at least about 50%, or at least about 75% relative to the thickness of the precursor web 34. The precursor web 34 will typically exhibit thinning of at least about 25%, at least about 50%, or at least about 75%, at least about 85% relative to the thickness of the land area surrounding the discrete extended elements 22 of the embossed web 16.

It should be noted that a fluid impermeable web having only the discrete extended elements 22 as disclosed herein, and not having macroscopic apertures 12 or discrete extended elements 22 having open distal ends 24, can offer softness for any application in which fluid permeability is not required. Thus, in one embodiment, the process produces an embossed web 16 exhibiting a soft and silky tactile impression on at least one surface thereof, the silky feeling surface of the embossed web 16 exhibiting a pattern of discrete extended elements 22, each of the discrete extended elements 22 being a protruded extension of the web surface and having a side wall defining an open proximal portion 30 and a closed or open distal end 24, the discrete extended elements 22 having a maximum lateral cross-sectional dimension at or near the open proximal portion 30.

The embossed web 16 can also exhibit improved sound effects. For example, when handled or manually manipulated, the embossed web 16 creates less sound as compared to the precursor web 34.

The "area density" of the discrete extended elements 22, which is the number of discrete extended elements 22 per unit area of first surface 26, can be optimized and the embossed web 16 will typically include about 4 to about 10,000, about 95 to about 10,000, about 240 to about 10,000, about 350 to about 10,000, about 500 to about 5,000, or about 700 to about 3,000 discrete extended elements 22 per square centimeter. In general, the center-to-center spacing can be optimized for adequate tactile impression, while at the same time minimizing entrapment of materials, such as fluids, between discrete extended elements 22. The center-to-center spacing between adjacent discrete extended elements 22 can be about 100 microns to about 1,000 microns, about 30 microns to about 800 microns, about 150 microns to about 600 microns, or about 180 microns to about 500 microns.

When the embossed web 16 is utilized as a topsheet for disposable absorbent articles, the embossed web 16 can further include macroapertures that allow fluid to flow through the embossed web 16.

Process for Making Embossed Web

Referring again to FIG. 6, the process for forming an embossed web 16 includes feeding the precursor web 34 between the static pressure plenum 36 and the forming structure 10 and applying a gas pressure from the static pressure plenum 36 against the precursor web 34 and the forming structure 10 sufficient to force portions of the precursor web 34 into void volumes defined by the apertures 12 or depressions 14 of the forming structure 10 to thereby form an embossed web 16 having discrete extended elements 22. The conformation of the precursor web 34 to the forming structure 10 can be partial conformation, substantial conformation, or complete conformation, depending upon the pressure generated and the topography of the forming structure 10. While not being bound by theory, it is believed that open distal ends 24 can be formed by locally rupturing the precursor web 34 while forcing the precursor web 34 into the apertures 12 or depressions 14 of the forming structure 10.

To obtain permanent deformation of the precursor web 34 to form the embossed web 16, the applied pressure is generally sufficient to stretch the precursor beyond its yield point.

The process can be a batch process or a continuous process. A batch process can involve providing individual sheets of precursor web 34 material placed between the forming structure 10 and static pressure plenum 36.

A continuous process can involve providing a roll of precursor web 34 material that is unwound and fed between the forming structure 10 and static pressure plenum 36. The forming structure 10 can be, for example, in the form of a roll. As the precursor web 34 passes between the forming structure 10 roll and the static pressure plenum 36, an embossed web 16 is formed.

The process can have relatively short dwell times. As used herein, the term "dwell time" refers to the amount of time pressure is applied to a given portion of the precursor web 34, usually the amount of time a given portion of the precursor web 34 spends positioned between the forming structure 10 and static pressure plenum 36. The pressure is typically applied to the precursor web 34 for a dwell time of less than about 5 seconds, less than about 1 second, less than about 0.5 second, less than about 0.1 second, less than about 0.01 second, or less than about 0.005 second. For example, the dwell time can be about 0.5 milliseconds to about 50 milliseconds. Even with such relatively short dwell times, embossed webs can be produced with desirable structural features described herein. As a result, the process of the disclosure enables high speed production of embossed webs.

The precursor web 34 can be fed between the forming structure 10 and the static pressure plenum 36 at a rate of at least about 0.01 meters per second, at least about 1 meter per second, at least about 5 meters per second, or at least about 10 meters per second. Other suitable rates include, for example, at least about 0.01, 0.05, 0.1, 0.5, 1, 2, 3, 4, 5, 6, 7, 8, 9, or 10 meters per second.

Depending upon factors such as the shape of the apertures 12 or depressions 14 on the forming structure 10 and the pressure applied, the distal ends 24 of the extended elements of the embossed web 16 produced by the process of the disclosure can be either closed or open.

The process can be carried out at ambient temperature, meaning that no heat is intentionally applied to the forming structure 10 and/or precursor web 34. It should be recognized, however, that heat can be generated due to the pressure between the forming structure 10 and the static pressure plenum 36, especially in a continuous process. As a result, the forming structure 10 and/or the compliant substrate may be cooled in order to maintain the process conditions at the desired temperature, such as ambient temperature.

The process can also be carried out with the precursor web 34 having an elevated temperature. For example, the temperature of the precursor web 34 can be less than the melting point of the precursor web 34. For example, the temperature of the precursor web 34 can be at least about 10° C. below the melting point of the precursor web 34. The precursor web 34, especially a precursor web 34 including polyethylenes, can have a temperature during the process of about 10° C. to about 200° C., about 10° C. to about 120° C., about 20° C. to about 110° C., about 10° C. to about 80° C., or about 10° C. to about 40° C. The precursor web 34 can be heated during the process by heating the precursor web 34, using a heated fluid pressure source for the static pressure plenum 36, and/or by heating the forming structure 10. For example, a heated gas can be used as the pressure source for the static pressure plenum 36.

In one embodiment, the precursor web is not heated before being provided between the forming structure and the compliant substrate. In another embodiment, the precursor web, the forming structure and the compliant substrate are not heated before providing the precursor web between the forming structure and the compliant substrate.

In general, the process of the present invention can be carried out at a temperature of from about 10° C. to about 200° C., from about 10° C. to about 120° C., from about 10° C. to about 80° C., or from about 10° C. to about 40° C. The temperature can be measured by, for example, a non-contact thermometer, such as an infrared thermometer or a laser thermometer, measuring the temperature at the nip between the compliant substrate and forming structure. The temperature can also be determined using temperature sensitive material such as Thermolabel available from Paper Thermometer Company.

An average pressure is provided by the static pressure plenum 36. The average pressure is sufficient to force the precursor web 34, which is positioned between the forming structure 10 and static pressure plenum 36, into the discrete apertures 12 or depressions 14 of the forming structure 10 to form an embossed web 16. In general, the average pressure provided between the forming structure 10 and static pressure plenum 36 is about 0.1 MPa to about 25 MPa, about 1 MPa to about 20 MPa, about 0.5 MPa to about 10 MPa, about 10 MPa to about 25 MPa, or about 0.5 MPa to about 5 MPa.

The process can optionally further include applying a slip agent to the precursor web 34 and/or the forming structure 10 before the precursor web 34 is provided between the forming structure 10 and the static pressure plenum 36. This can be beneficial, especially in a continuous process, to reduce friction between the precursor web 34 and the forming structure 10. Non-limiting examples of suitable slip agents include silicone, talc, lubricating oils, and the like.

The process can optionally be combined with other processes to further manipulate the embossed web 16. In one embodiment, such additional processes can be combined with the process on the same process manufacturing line to produce, for example, absorbent articles. In one embodiment, the process is combined with a process that can impart macroapertures in the embossed web 16, such as the process described in US 2006/0087053 A1 or US 2005/0064136 A1. Such a process combination can produce a macroapertured embossed web 16 that can be suitable for use as a topsheet in an absorbent article. Such a macroapertured embossed web 16 can be subsequently converted into an absorbent article by combining it with other absorbent article components, such as absorbent cores, backsheets, and the like, preferably on the same process manufacturing line.

In addition to the processes described hereinbefore, alternative processes for making embossed webs are contemplated. The process can further include applying pressure from a second pressure source. The second pressure source can be selected from the group consisting of a static liquid pressure plenum, a static gas pressure plenum, a velocity gas pressure source, such as an air knife, a velocity liquid pressure source, such as is used in conventional hydroforming process, and a compliant substrate. U.S. Patent Application No. 61/159,906, discloses a suitable compliant substrate for use in the process of the present disclosure. The pressures exerted on the precursor web 34 by the second pressure source will typically be similar to those pressures exerted on the precursor web 34 by the static pressure plenum 36 described hereinbefore. The second pressure source can apply a pressure against the precursor web before or after the static pressure plenum. For example, the process can include using multiple static pressure plenums. In one embodiment, at least two static pressure plenums are provided and pressure is applied on a first portion of the precursor web 34 between the forming structure 10 and a first static pressure plenum. Pressure can then be applied on the first portion of the precursor web 34 between the forming structure 10 and a second static pressure plenum. This can further force the portion of the precursor web registered to the same apertures or depressions of the forming structure. This can allow for enhancement of the discrete extended elements 22 formed by the process.

Uses of Embossed Web

The embossed webs can be utilized in a number of different ways, including as component materials of absorbent articles (such as topsheets, backsheets or release paper wrappers), packaging (such as flow wrap, shrink wrap, or polybags), trash bags, food wrap, dental floss, wipes, electronic components, wall paper, clothing, aprons, window coverings, placemats, book covers, and the like.

EXAMPLES

The following are non-limiting examples of a process for making an embossed web of the present invention.

Example 1

Figure 7:
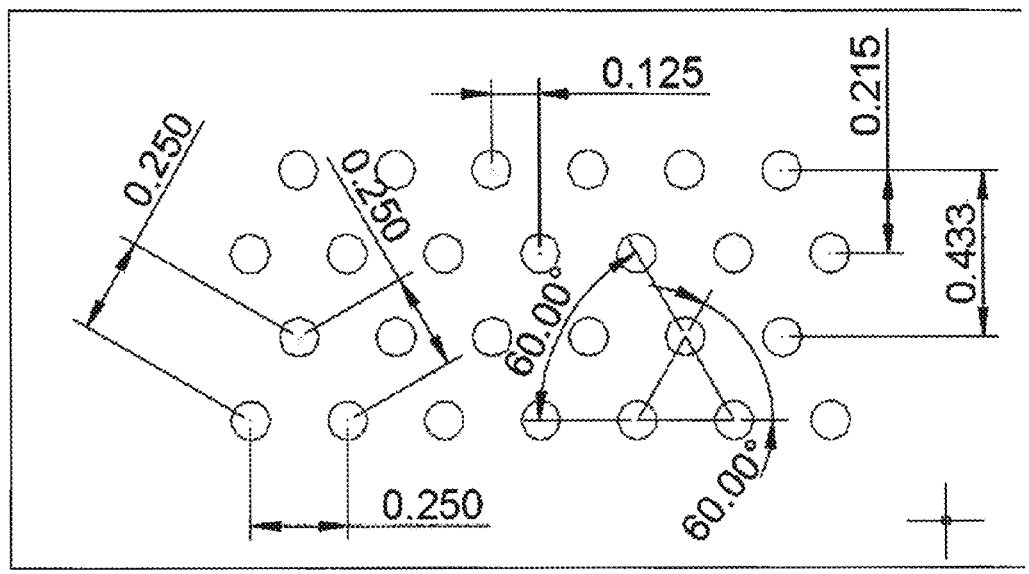
FIG. 7 is a schematic representation of the aperture arrangement of a forming structure of use in a process in accordance with an embodiment of the disclosure.

Embossed webs are produced using a static gas pressure plenum and a forming structure 10 having about 1550 apertures per square centimeter (about 10,000 apertures per square inch, 100 mesh metallic apertured plate). The forming structure is made of metal and has a thickness of about 1 mm. The apertures have a circular cross-section with a diameter of about 180 microns and a center-to-center spacing of about 250 microns. The sidewalls of the apertures are straight. As illustrated in FIG. 7, the apertures are offset relative to adjacent apertures.

The precursor web 34 utilized is a polyethylene film obtained from RKW US, Inc. that is about 15 microns thick and has a basis weight of 14.2 grams per square meter ("gsm").

Figure 8:
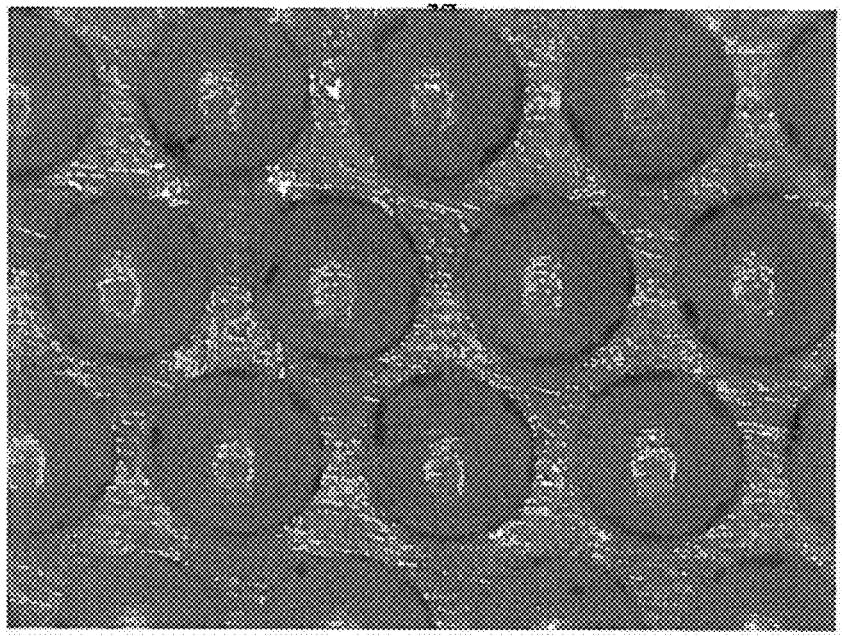
FIG. 8 is a photomicrograph top view of an embossed web formed by a process in accordance with an embodiment of the disclosure.

The embossing process is performed using a high speed research press with the forming structure preheated to a temperature of about 110° C. The high speed research press is described in detail in U.S. Patent Publication No. 2009/0120308, and is designed to simulate a continuous production line process for embossing the precursor web 34. The press includes a manifold plate having a 25 mm×25 mm opening surrounded by rubber (40A durometer Neoprene), which is connected to a high pressure source to deliver the pressure for the static gas pressure plenum. The forming structure engages the rubber of the manifold plate to a compression distance of about 1.8 mm, sealing the precursor web between the forming structure and the rubber. A pressure differential is thereby created across the precursor web by the static gas pressure plenum, with atmospheric pressure being present on the forming structure facing side of the precursor web and a pressure of about 2 MPa on the opposing side of the precursor web from the static gas pressure plenum. The press is operated to simulate forming structure roll diameters of 205 mm. The precursor web 34 is fed between the forming structure 10 and the static gas pressure plenum at a simulated rate of about 2.74 msec. The dwell time is about 0.19 seconds. The resulting embossed web includes discrete extended elements having an average height of about 68 microns and closed distal ends (as shown in FIG. 8).

Example 2

Embossed webs are produced using a static gas pressure plenum and a forming structure 10 having about 1550 apertures per square centimeter (about 10,000 apertures per square inch, 100 mesh metallic apertured plate). The forming structure is made of metal and has a thickness of about 1 mm. The apertures have a circular cross-section with a diameter of about 180 microns and a center-to-center spacing of about 250 microns. The sidewalls of the apertures are straight. As illustrated in FIG. 7, the apertures are offset relative to adjacent apertures.

The precursor web 34 utilized is a polyethylene film obtained from RKW US, Inc. that is about 15 microns thick and has a basis weight of 14.2 grams per square meter ("gsm").

Figure 9:
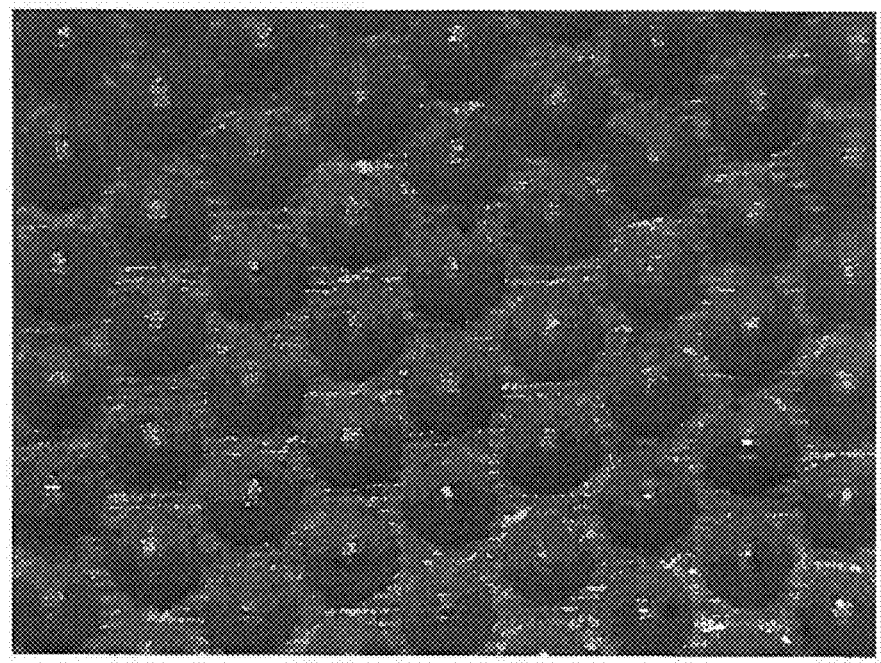
FIG. 9 is a photomicrograph perspective view of an embossed web formed by a process in accordance with an embodiment of the disclosure.

The embossing process is performed using a high speed research press, as described in Example 1. The press is operated to simulate a forming structure roll diameter of 205 mm. The forming structure is preheated to a temperature of about 90° C. The precursor web 34 is fed between the forming structure 10 and the static gas pressure plenum 36 at a simulated rate of 2.74 m/sec. The static pressure plenum generates a pressure of about 2 MPa. The dwell time is about 0.19 seconds. The embossed web 16 includes discrete extended elements having a height of about 57 microns and closed distal ends (as shown in FIG. 9).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

When a technical feature is disclosed herein in relation to one embodiment, this feature can be combined with any other feature(s) disclosed in other embodiment(s) or claim(s), unless stated otherwise.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making an embossed film web, comprising:
    feeding a precursor film web between a static gas pressure plenum and a forming structure comprising a plurality of discrete apertures, discrete depressions, or combinations thereof, the apertures or depressions having a depth of at least substantially equal to a thickness of the precursor web, and wherein the static gas pressure plenum creates static pressure conditions;
    applying static pressure from the static gas pressure plenum against the precursor web opposite the forming structure creating a pressure differential across the precursor web sufficient to force the precursor web into the apertures or depressions of the forming structure, thereby forming the embossed web comprising a plurality of discrete extended elements having open proximal ends; and
    applying pressure from a second pressure source against the precursor web sufficient to force portions of the precursor web into void volumes defined by the apertures or depressions, wherein the pressure from the second pressure source is applied sequentially before or after the static pressure is applied against the precursor web from the static gas pressure plenum.

2. The process of claim 1, comprising feeding the precursor web between the static gas pressure plenum and the forming structure at a rate of at least about 1 meter per second.

3. The process of claim 1, comprising applying pressure for a dwell time of about 1 millisecond to about 5 seconds.

4. The process of claim 1, wherein the temperature of the precursor web during the process is less than the melting point of the precursor web.

5. The process of claim 4, wherein the temperature of the precursor web at least about 10° C. below the melting point of the precursor web.

6. The process of claim 1, wherein the temperature of the precursor web during the process is about 20° C. to about 110° C.

7. The process of claim 1, wherein the gas comprises at least one gas selected from the group consisting of nitrogen, carbon dioxide, and mixtures thereof.

8. The process of claim 1, wherein the gas comprises air.

9. The process of claim 1, wherein the apertures or depressions have a depth of at least three times the thickness of the precursor web.

10. The process of claim 1, wherein the apertures or depressions of the forming structure have an average edge-to-edge spacing of about 30 microns to about 800 microns.

11. The process of claim 1, wherein the apertures or depressions of the forming structure having an average width of about 10 microns to about 5 mm.

12. The process of claim 1, wherein the apertures or depressions have a depth of about 25 microns to about 5000 microns.

13. The process of claim 1, wherein the extended elements of the embossed web have open distal ends.

14. The process of claim 1, wherein the extended elements of the embossed web have closed distal ends.

15. The process of claim 1, wherein the extended elements of the embossed web have an aspect ratio of at least about 0.2.

16. The process of claim 1, wherein the applied pressure is about 0.1 MPa to about 25 MPa.

17. The process of claim 16, wherein the applied pressure is about 0.5 MPa to about 5 MPa.

18. The process of claim 1, wherein the extended elements are thinned relative to the thickness of the precursor web.

19. The process of claim 1, wherein the applied pressure is sufficient to stretch the precursor web beyond the yield point of the precursor web.

20. The process of claim 1, wherein the precursor web is selected from the group consisting of polyethylene, polypropylene, and blends thereof.

21. The process of claim 1, wherein pressure is applied from the second pressure source before pressure is applied from the static gas pressure plenum.

22. The process of claim 1, wherein pressure is applied from the second pressure source after pressure is applied from the static gas pressure plenum.

23. The process of claim 1, wherein the second pressure source is selected from the group consisting of a static liquid pressure plenum, a static gas pressure plenum, a velocity gas pressure source, a velocity liquid pressure source, and a compliant substrate.

* * * * *